United States Patent [19]
Shyu et al.

[11] Patent Number: 5,923,792
[45] Date of Patent: Jul. 13, 1999

[54] SCREEN DISPLAY METHODS FOR COMPUTER-AIDED DATA ENTRY

[75] Inventors: Ing-Shyh Shyu, Taipei; Wen-Wen Lin, Tainan; Yao-Nan Lien, Fengyuan; Mou-Yen Chen, Taoyuan; Lo-Ting Tu, Taipei; Yea-Shuan Huang, Hsinchu, all of Taiwan

[73] Assignee: Industrial Technology Research Institute, Taiwan

[21] Appl. No.: 08/598,080

[22] Filed: Feb. 7, 1996

[51] Int. Cl.⁶ ................................................. G06K 9/03
[52] U.S. Cl. ................................................. 382/309
[58] Field of Search .................. 382/309, 310, 382/311

[56] References Cited

U.S. PATENT DOCUMENTS

| | | | |
|---|---|---|---|
| 4,566,127 | 1/1986 | Sekiya et al. | 382/309 |
| 4,813,077 | 3/1989 | Woods et al. | 382/311 |
| 5,123,062 | 6/1992 | Sangu | 382/57 |
| 5,153,927 | 10/1992 | Yamanari et al. | 382/61 |
| 5,233,672 | 8/1993 | Yamanari et al. | 382/57 |
| 5,235,654 | 8/1993 | Anderson et al. | 382/61 |
| 5,251,273 | 10/1993 | Betts et al. | 382/57 |
| 5,293,429 | 3/1994 | Pizano et al. | 382/267 |
| 5,305,396 | 4/1994 | Betts et al. | 382/36 |
| 5,550,930 | 8/1996 | Berman et al. | 382/311 |

*Primary Examiner*—Jose L. Couso
*Attorney, Agent, or Firm*—Proskauer Rose LLP

[57] ABSTRACT

An optical character recognition screen editing process is performed efficiently and only when necessary. The process is ordered so that editing is performed in increasing order of work intensity. That is, less "expensive" (i.e., less time consuming) correction methods are performed first, as a filter for more "expensive" correction methods. In the preferred embodiment, individual character are corrected first, information fields are corrected second, and entire forms are correction last. Preferably, the individual characters may be collected from a number of forms before being displayed for correction.

21 Claims, 8 Drawing Sheets

SCREEN DISPLAY METHODS FOR COMPUTER-AIDED DATA ENTRY

RELATED APPLICATION

This patent application includes subject matter related to U.S. patent application Ser. No. 08/489,945, entitled "Optical Character Recognition System For Forms Having Printed and Handwritten Characters", filed on Jun. 13, 1995 and invented by Ing-Shyh Shyu, Lo-Ting Tu, Mou-Yen Chen, Wen-Wen Lin, and Kai-Hsiang Chou. The contents of that application are incorporated herein by reference.

FIELD OF THE INVENTION

The present invention is directed to optical character recognition and, more particularly, to a highly efficient method for manually correcting rejected characters or character fields.

BACKGROUND OF THE INVENTION

Many businesses and governmental agencies process a large number of printed forms which, when completed, contain handwritten entries.

There are a number of known ways to extract and process the information contained in the handwritten entries on the forms and to store the information and the forms. For example, the data may be extracted using known image scanning devices and optical character recognition technologies to extract either the printed or handwritten data on the form. An image of the form itself may be stored, for example, by photographing the document onto microfilm or microfiche, or by optically scanning the form and storing an electronic image of it on laser disk or other electronic storage medium. Image scanning devices and optical character recognition ("OCR") technology are well known and commercially available. An OCR device improved over these known devices is disclosed in related application Ser. No. 08/489,945.

Figure 1:
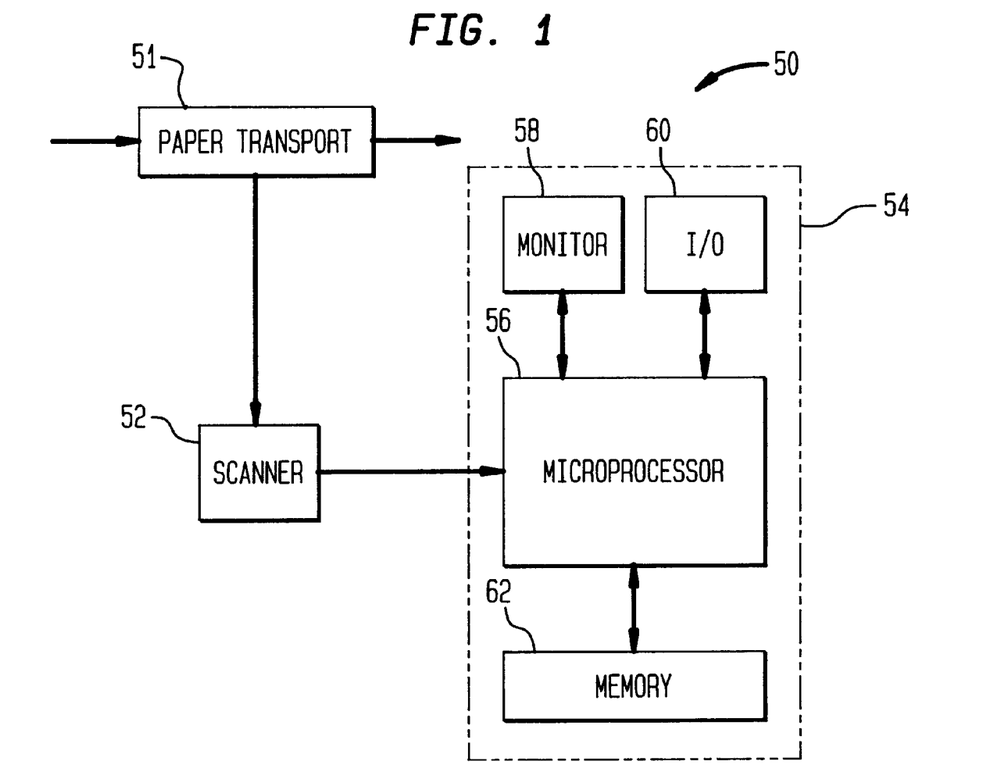
FIG. 1 is a block diagram of the components for an OCR device.

FIG. 1 is a block diagram of a typical OCR system 50, such as may be used with the present invention. This system 50 includes a paper transport system 51. The paper transport system 51 moves the forms in the direction of the arrow past an optical scanner ("OCR scanner") 52. A preferred embodiment of the OCR scanner 52 forms a digital image of a form by illuminating the form with a bright light such as a laser light and then recording the reflected light using storage devices such as CCDs. This type of scanner may be used to form a bitonal digital image wherein each pixel is either white or black, corresponding to logic "1" or logic "0". One such OCR scanner 52 is a model TDC2610W, manufactured by Terminal Data Corp.

The scanner 52 may be connected to a processor 54, such as a general purpose computer or a special purpose hardware processing element. The processor's hardware elements may be optical processing elements or electronic processing elements such as resistor summing networks and digital logic circuits. The processor may include a microprocessor 56 and other components; a screen or monitor 58; and a keyboard or other input device 60. The processor 54 may also include a memory device 62 for storing the scanned documents. This memory device may be, for example, a disk memory, a RAM, or other memory device.

The forms to be read are scanned in the OCR scanner 52. Information on the forms may be provided in fields (i.e., a "name" field, an "address" field, etc.). Before the forms are scanned, the processor 54 may already have "learned" the location and expected content of particular fields. For example, the processor 54 may have "learned" that a handwritten address is expected at a particular location on a particular document (see, for example, U.S. patent application Ser. No. 08/489,945). The image data information is processed in the processor 54. During processing, an image of the scanned forms and character recognition information may be displayed on the screen 58.

Character recognition systems, particularly those which recognize handwritten characters, cannot guarantee a completely error free recognition. Recognition mistakes inevitably occur. Thus, some manual editing (i.e., performed by a human editor) is typically needed. In some conventional systems, character recognition systems often refuse to recognize characters that are sloppily written or illegible, so that the ratio of correctly to incorrectly recognized characters increases. This higher recognition correctness rate makes an automated system more valuable than a manual data entry system, wherein a human data processor reads a document and manually types the data. Therefore, it is a desirable characteristic of an optical character recognition system to provide an efficient method for manually editing unrecognized or rejected characters, words, or field entries.

Optically recognized documents may be classified into one of the following three categories:

1. "Correct" or Full Automatic Recognition: each character on the document is recognized and the document as a whole passes all integrity checks such as dictionary (i.e., recognized characters form a known word) and grammar (i.e., recognized words form grammatically correct phrases or sentences) processing. No additional editing is required and any recognition mistakes in the document are due to system inherent errors. For a practical system, the inherent error rate of the system should be lower than that of a manual entry system.

2. Manual Editing Required: a document requiring some manual editing. If a number of characters on the document are rejected (i.e., the character cannot be recognized) or whose recognition results do not pass integrity checks (i.e., the recognized characters do not form a recognized word or recognized words do not form a valid phrase or sentence), the document is manually edited.

3. Rejected Document: a document rejected by the recognition system. A rejection could be caused, for example, by a poor quality scanned image, form error, or sloppy handwriting. The data on a rejected document must be entirely manually processed.

OCR devices typically include a screen editing fiction which displays rejected documents on a computer screen and allows an editor to input corrections. Generally, an image of the entire form, or a large portion (or "block") of the entire form, containing a rejected character is displayed on the screen so that the data entry operator need not refer to the original (hard copy) document. This method is satisfactory for processing a relatively small number of documents. Where a large number of documents—i.e., millions of strokes (characters) requiring dozens of data entry operators—this method is not efficient because each rejected document is displayed on the screen, regardless of the number of rejected characters in the document. Thus, even if a single character is rejected in a document, the entire document appears on the screen. This results in a bottleneck that slows down the entire OCR process.

Optical character recognition systems have addressed some of these problems. For example, U.S. Pat. No. 5,251, 273 to Betts et al. discloses a data processing system and method for sequentially correcting character recognition errors for scanned images of document forms. The device disclosed in this reference has three recognition coded data correction processors. These correction processors are (1) an artificial intelligence processor, (2) a database error processor, and (3) a manual verification and correction processor. A machine-generated data structure records recognition results and correction histories and transfers these to each consecutive processor. After the artificial intelligence and database error correction processes are complete, field data segments may be displayed on a workstation for manual correction.

U.S. Pat. No. 5,305,396 to Betts et al. discloses a data processing system and method for selecting customized character recognition processes and coded data correction processes for scanned images of document forms. This reference discloses entering a document form processing template. The template includes customized system operation parameters which the data processing system reads before a completed form may be recognized.

U.S. Pat. No. 5,235,654 to Anderson et al. is directed to an advanced data capture architecture data processing system and method for scanned images of document forms. This reference discloses a system for generating new document forms for automatic processing.

U.S. Pat. No. 5,153,927 to Yamanari discloses a character reading system and method which allows a user to prepare a user specific processing program without knowing all of the specifications of the processing program. This reference discloses two processing sections, a standard processing section and a user defined processing section. The user-defined processing section allows the user to arbitrarily set a field which the user wants to check without affecting the standard processing section.

U.S. Pat. No. 5,233,627 to Yamanari et al. is directed to a character reader and recognizer with a specialized editing function. This reference discloses a character reader device which avoids a situation where the image data displayed on a workstation screen overlaps an area for displaying a particular image containing a rejected character.

U.S. Pat. No. 5,123,062 to Sangu discloses a screen display layout of an entire scanned document image and displays the recognition results obtained during the recognition process.

It is an object of the present invention to provide an efficient method of performing OCR screen editing.

It is another object of the present invention to provide an OCR screen editing method that has an easily understood screen layout.

It is yet a further object of the present invention to provide a screen editing method where only portions of a form may be displayed for editing.

It is yet an even further object of the present invention to provide a method for simultaneously screen editing a number of scanned documents.

SUMMARY OF THE INVENTION

A preferred embodiment provides an optical character recognition screen editing process, wherein manual editing is performed efficiently and only when necessary. The process is ordered so that editing is performed in increasing order of work intensity. That is, less "expensive" (i.e., less time consuming) correction methods are performed first, as a filter for more "expensive" correction methods. In the preferred embodiment, individual characters are corrected first, information fields are corrected second, and entire forms are corrected last. Preferably, the individual characters may be collected from a number of forms before being displayed for correction.

After a document is scanned and recognized, it may be classified as correct (no editing needed), manual editing required, or rejected. The correct documents are stored. Rejected documents are individually edited. The rejected characters (i.e., letters, numbers, kana characters, kanji characters, etc.) from one or more documents needing manual editing are collected and displayed on a computer monitor for correction. In a preferred embodiment, these characters may be arranged in size or image density (darkness) order and then aligned to appear centered. Arranging and aligning the characters makes the collection of rejected characters displayed on the screen look less confusing and is easier for the editor to understand.

After the characters are corrected, fields of the scanned documents are checked for integrity—for example, a zip code entry may be compared with the corresponding town entry to make sure they match, or a mathematical equation may be checked for accuracy. If a field does not pass the integrity check, it is displayed on the screen for editing and an editor may input a corrected character string. The field may again be checked for integrity. If it fails more than once, the field is displayed with field information highlighted, or with related fields (i.e., a zip code and a town, or all numbers in a mathematical equation).

Once all of the fields in a document are correct, it may be stored in a database. If the document cannot pass the character correction or field correction processes, it is rejected, and the entire form is displayed for correction. If the document still cannot be corrected, it is rejected.

BRIEF DESCRIPTION OF THE DRAWINGS

These and other features of the present invention will become apparent from the following detailed description, in conjunction with the following drawings, wherein.

DETAILED DESCRIPTION OF A PREFERRED EMBODIMENT

Overview of the Inventive Method

Figure 2:
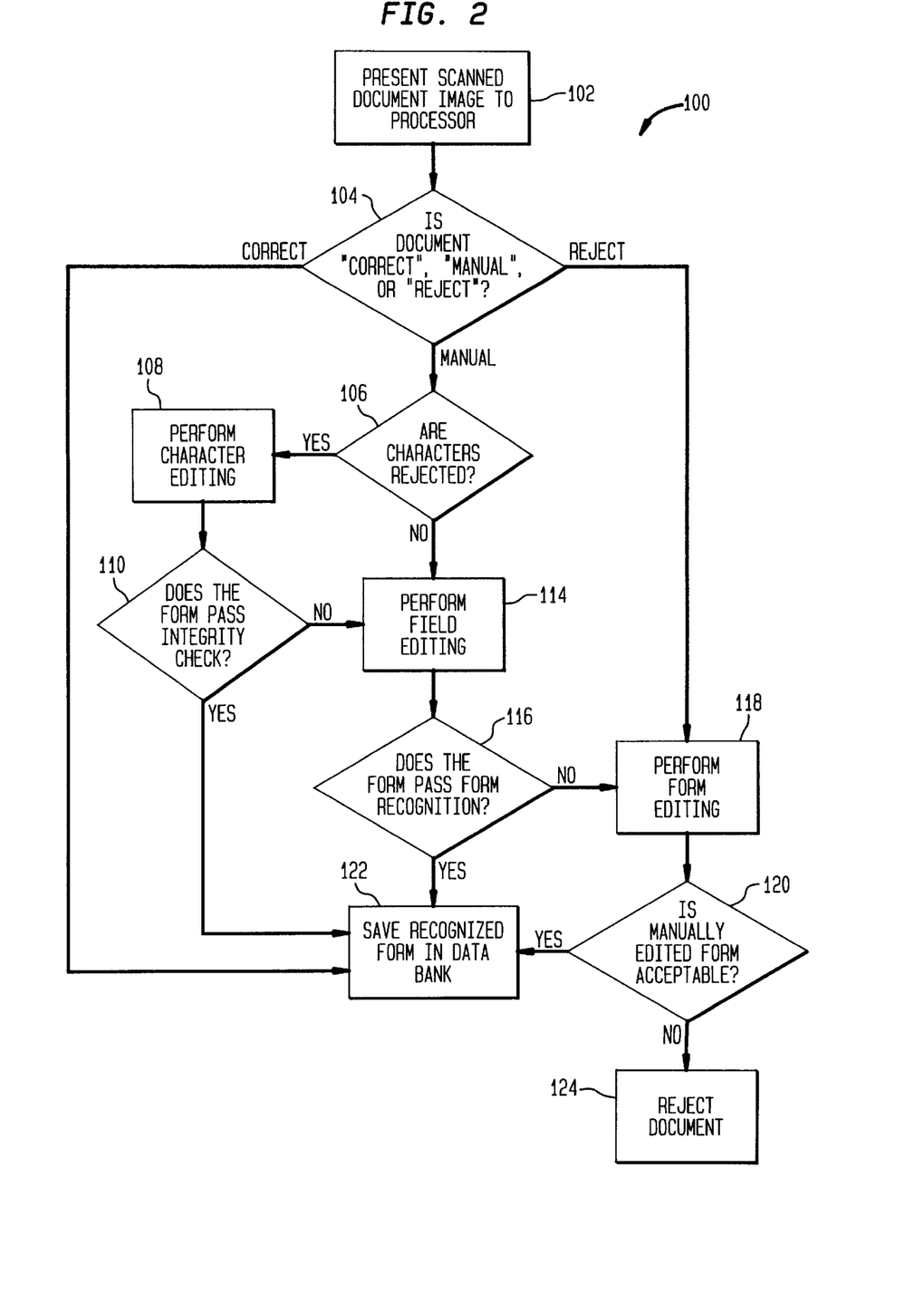
FIG. 2 is a flow chart of a screen editing process according to the present invention.

FIG. 2 is a flow chart of a preferred screen editing method 100 according to the present invention. The scanned document is placed on a paper transport system 51 and moved past an optical scanner 52. The scanned image is presented to the processor 54 (step 102). The document is recognized and converted into an intermediate file (an optical image undergoing verification) and is classified as one of a "correct" (or "full automatic recognition"), "manual editing required", or "rejected" document (step 104). If there are no unrecognized characters and each field satisfies the integrity test (described in more detail below), the document is classified as "correct". The correct, fully recognized document requires no further processing and is saved in a data bank (step 122).

Documents having unrecognized characters or rejected fields are classified as "manual editing required". Characters, as used here, is broadly defined. Characters may be, for example, arabic numerals, alphabetic letters, kana characters, kanji characters, etc. If some characters are unrecognized (step 106), the unrecognized characters are presented to a manual editor (e.g., a person) to perform character editing (step 108). Documents (1) requiring manual editing, but that had no unrecognized characters; and (2) character edited documents, are processed to determine if they pass the integrity checks, which check for correct entries in fields (step 110). If the document fails the integrity checks, field editing is performed (step 114).

Field edited documents are processed to determine if every field passes the integrity checks (form recognition) (step 116). If every field in a form passes the integrity checks, it is saved in the data bank (step 122). Documents failing form recognition (e.g., the characters were not properly read by the OCR device due to poor quality—sloppily or lightly written, etc.—characters, input errors, or the like) and "rejected" field edited documents have form editing performed (step 118). If form editing is required, all of the data on the form is input manually.

If the form edited document is acceptable (e.g., the human editor can correct the errors), an image of the document is saved on the databank (step 122); otherwise, the form is rejected (step 124). The data and optical image stored in the databank may be, for example, stored, searched, sorted, or otherwise used.

Character Editing

To perform character editing, a monitor 58 displays characters which were not recognized and thus caused a rejection. The displayed characters need not be from the same document. That is, the unrecognized characters displayed on the monitor may be from several documents (for example, a batch of scanned documents), not just a single document. (See FIG. 2, steps 106, 108.) This allows the character correction process to be performed for many documents simultaneously, resulting in a more efficient process. The editor may use a keyboard 60 to manually replace these unreadable characters or incorrectly read characters with correct characters.

After a predetermined number (a "batch") of forms are scanned, the image of each unrecognized character in each of the "manual" forms is stored in a file, for example, in the processor memory 62. Preferably, the image is stored with an identifier, such as a document and address identifier so that the location of the rejected character on the particular document may be located. Rejected characters are displayed on the monitor 58.

After the character recognition process is complete, unrecognized characters are corrected by manual editing. A character may be unrecognized for many reason. Typically an unrecognized character is either written too large or too small on the document, the quality is poor (i.e., the strokes are broken or clustered), or more than one character is being treated as a single character. A preferred embodiment of the invention displays on the screen 58 a list of characters which cannot be recognized. The on-screen display should be configured to reduce the effects of the poor quality characters as much as possible to provide the manual editor with as understandable a display as possible, thus permitting an efficient editing process. To reduce the effects of poor quality characters, the present invention preferably: (1) arranges character images on a center alignment principle; (2) arranges character images on a size basis, i.e., from small to large or from large to small; (3) arranged in order of increasing or decreasing darkness; and/or (4) displays letters at one time and numbers at another. This fourth item avoids confusion between, for example, number 0 and letters O or D.

Figure 3:
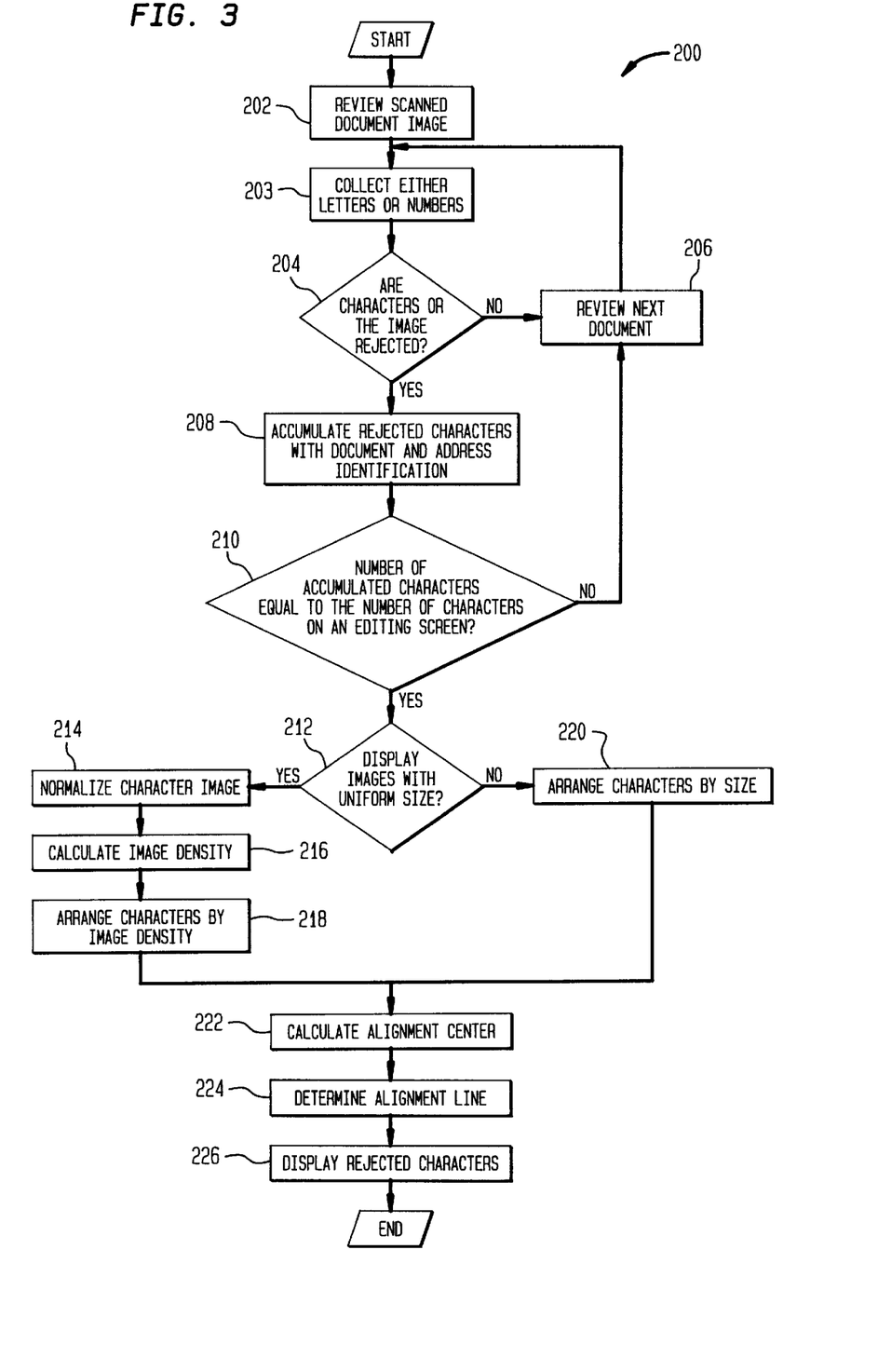
FIG. 3 is a flow chart of a character editing screen display method according to the present invention.

FIG. 3 is a flow chart of a preferred character editing screen display method 200. A batch of documents are scanned. A first document image is reviewed (step 202). To avoid confusion, either images located where alphabetic characters are expected to be located or numerals are expected to be located are processed at one time (i.e., avoiding confusion between number 0 and letters O and D) (step 203). If all characters are recognized (step 204), the next document image is reviewed (step 206). If characters are not recognized (step 204), the images of the unrecognized characters are accumulated in memory 62, preferably with identification information, such as the batch and document number and location of the character on the document. When the number of accumulated unrecognized characters is equal to the number of characters that may be displayed on an editing screen (step 210), an image arrangement is determined.

For example, if the rejected character images are to be displayed at a uniform size (step 212), then the characters may be normalized and arranged according to image density (darkness) order. First, the character images are normalized so that their heights and widths are approximately the same (step 214). This may be done by using any well known normalization technique. Then the image density is calculated in a conventional manner (such as determining the number of black pixels per unit area) (step 216) and the images are arranged according to the calculated image density (step 218). If the rejected character images are not to be displayed at a uniform height (step 212), the images may be arranged according to size (step 220). Empirical studies by the assignee of this invention reveal that human operators more easily comprehend characters arranged either by image density or size.

After the characters are arranged according to size and/or image density, the characters are aligned. First, the alignment center is determined (step 222) by finding a center point of each character to be displayed. After the center is determined, the alignment line is determined for each character to be displayed (step 224). For example, the characters may be aligned based on a horizontal or vertical center line, or a horizontal bottom line. Then the rejected characters are displayed on the monitor 58 (step 226). The editor may enter corrected characters using an input device 60, such as a keyboard or mouse. The process may be repeated for the other types of characters (e.g., numerals if alphabetic characters were processed).

Figure 4:
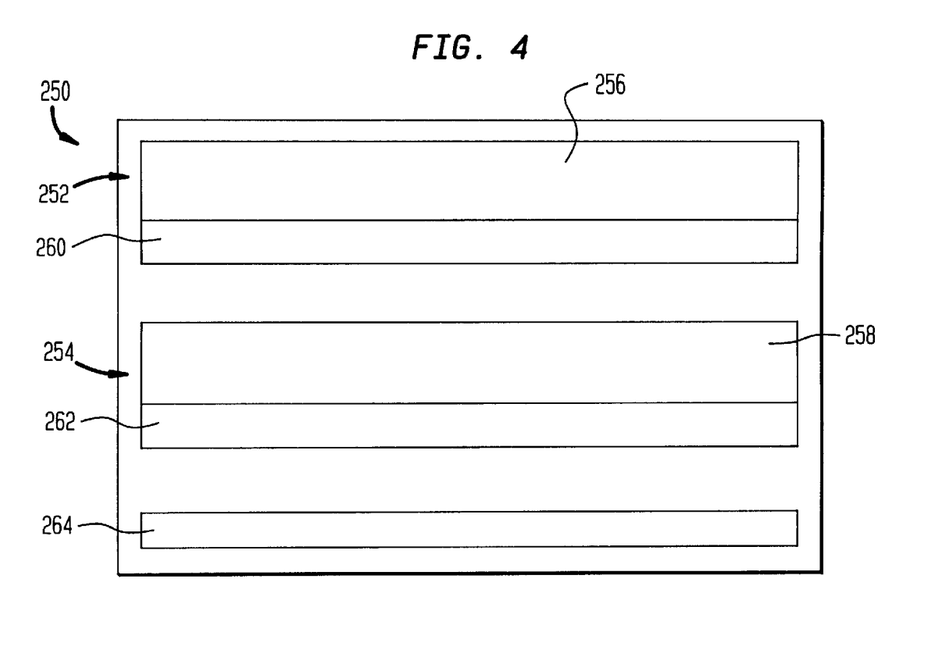
FIG. 4 is an illustrative screen display layout during character editing.

FIG. 4 is an illustrative screen display layout 250 during character editing. The monitor 58 has a screen configuration 250 divided into an upper display area 252, a lower display area 254, and a file identification area 256. Each of the display areas 252, 254 is further divided into two sections, an image section 258, 260 and a character section 262, 264. The image sections 258, 260 display the image of the rejected characters. The character sections 262, 264 include a space to view the corrected character input by the editor to be viewed. The file identification area 256 displays information about the displayed characters, such as the batch number.

Figure 5:
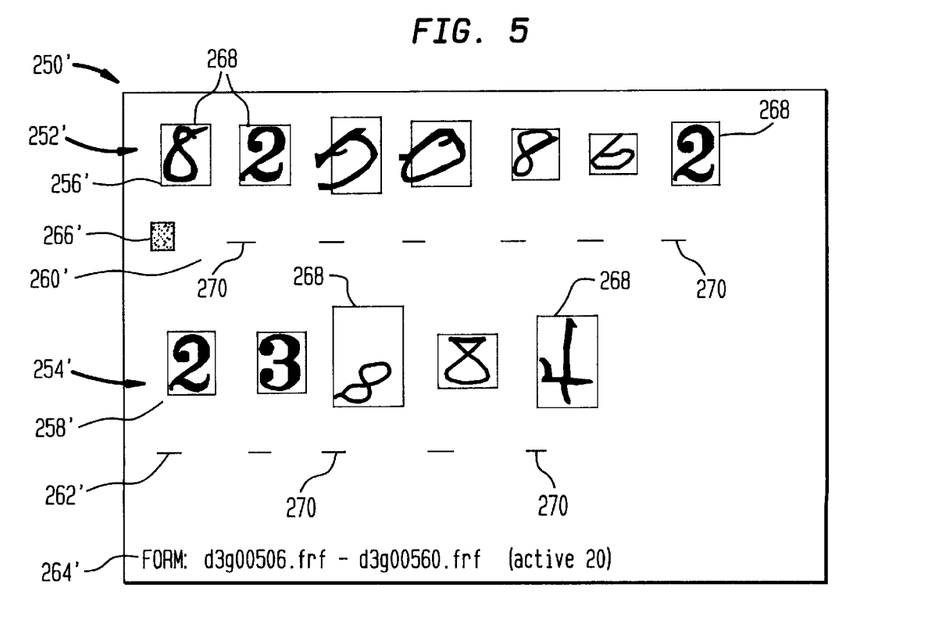
FIG. 5 is an exemplary character editing screen display.

FIG. 5 is an exemplary character editing screen display 250'. The upper display area 252' has an image display section 256' and a character section 260'. The character section 260 has an input line below the displayed rejected characters. The lower display area 254' also has an image display section 258' and a character section 262'. The file identification line 264' identifies the files from which the rejected characters are taken. The cursor 266' is shown. Each rejected character image is enclosed in a frame 268'; below each frame is a line 170' to input a corrected character.

Figure 6:
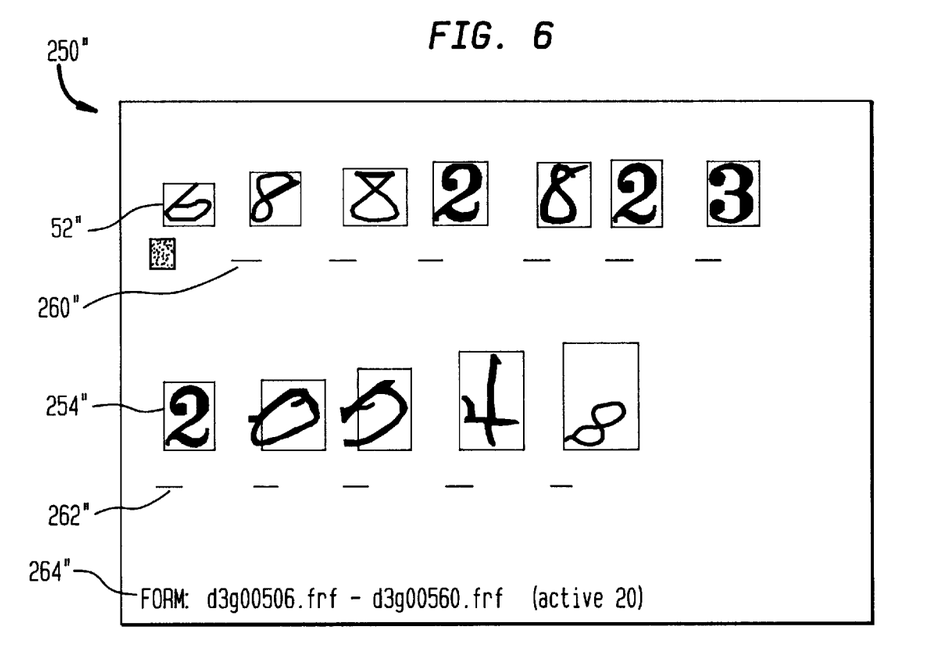
FIG. 6 is an exemplary character editing screen display with the rejected characters arranged by size and aligned.

FIG. 6 shows the same character editing screen 250" except that the displayed rejected characters are arranged by increasing size and aligned by lower boundary of the character frames (in FIG. 5, the characters are aligned by geometric centers of the characters). To most viewers, the characters are more readily understood as arranged in FIG. 6 than as in FIG. 5. Once the characters are corrected, they are easily redirected to the proper location because the character images are stored with identification information.

In a preferred embodiment, the character editing process is performed as follows. A number of documents (i.e., a batch) are scanned in the optical scanner 52. A batch comprises a predetermined number of documents, 500 for example. Thus, a program parameter FilesPerBatch=500 is used, and the following batch numbers are generated:

| Batch Number | File Order Number |
| --- | --- |
| 0 | 00001–00500 |
| 1 | 00501–01,000 |
| * * * | * * * |
| 10 | 05,001–05,500 |
| * * * | * * * |
| 19 | 09,501–10,000 |

An editor will enter the batch to be edited—BatchNo. The rejected characters for part or all of the batch are displayed, as described. The editor reviews the rejected characters and keys in a corrected character using an input/output device such as a keyboard or mouse 60. A key definition of a currently preferred embodiment is:

| Data | Keys |
| --- | --- |
| Normal Letter | Letter keys on keyboard |
| Normal Number | Number keys on keyboard |
| Next Page Command | "Enter" or ";" |
| Unrecognizable Character | Delete With Space Bar |

Unrecognizable characters either are unintelligible to the editor, or contain two or more characters in a single space and cannot be corrected in that single space. They are deleted with a space bar. The field having the unrecognizable character will fail the field processing, and the entire field (not just a single character) may be corrected.

Field Editing

After a document (or documents) has been character edited, the integrity of the contents of fields are checked to determine if they make "sense". Field editing may be performed on: (1) documents that had no characters rejected, but the fully recognized characters in one or more fields did not pass the integrity checks (see FIG. 2, steps 106, 114); (2) had rejected characters that were corrected, but having fields that did not pass the integrity checks (see FIG. 2, steps 110, 114); or (3) having characters that were not corrected (i.e., two characters were identified by the OCR as a single character). Suitable integrity checks may be post-word processing and field inspection.

Post word processing compares field entries with predefined information maintained, for example, in the processor memory 62 to cross-check the accuracy of the entries. For example, a word database may contain a number of city, country, road names, and section numbers for a geographical area. The recognized words may be compared to the stored words to determine the recognition accuracy. For example, state, town, and zip code information may be cross-checked to verify the characters.

A field inspection checks a value range for each character or determines whether the characters in a field or fields satisfy a predetermined relationship. For example, if field C is expected to contain the numerical difference between fields A and B (e.g., C=A−B), a field inspection may use, for example, the microprocessor 56 to subtract the recognized number in field B from the recognized number in field A and determine if it equals the recognized number in field C. If it does not, one or more of fields A, B, and C may be incorrect. Because the error may have occurred in one or more of these fields, all three fields may be rejected and require field editing.

To avoid confusion to the editor, only a single field is displayed at a time or only a single set of related fields, as described below. After a field is corrected by an editor, it is again checked for integrity.

Figure 7:
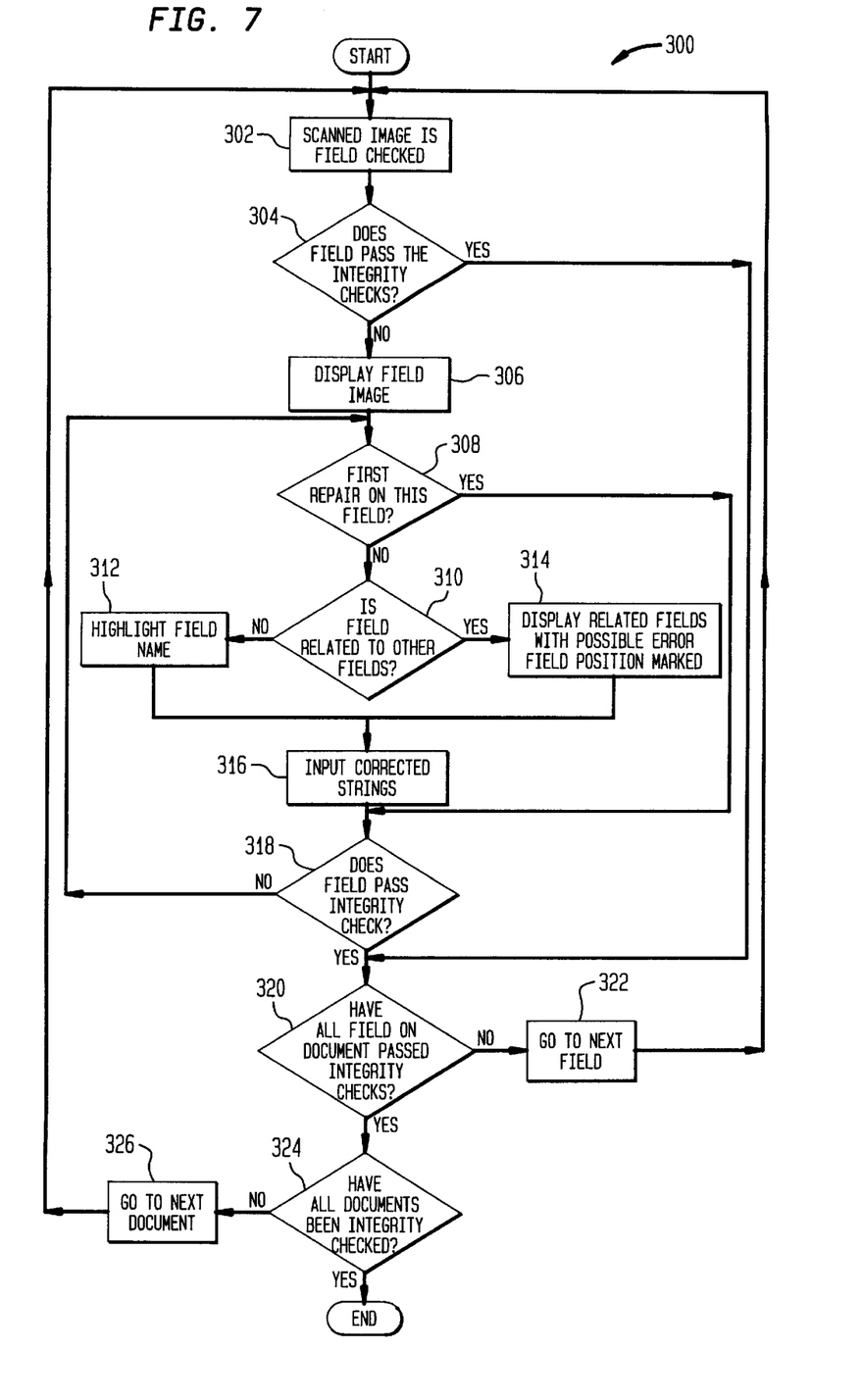
FIG. 7 is a flow chart of a preferred field editing method according to the present invention.

FIG. 7 is a flow chart of a preferred field editing method 300 according to the present invention. A scanned image is post-word processed or field inspected (step 302), for example, by the processor 54. If a field on a form passes the integrity checks (step 304), no field correction is required on this field, and the next field is processed (steps 320, 322). If the field fails the integrity check (step 304), field correction is required, and this field is displayed on the monitor 58 (step 306). If this is the first time the field has been corrected (step 308), the editor inputs corrected characters to correct the field (step 316) using, for example, an input device 60, such as a keyboard or mouse. The corrected character string is integrity checked (step 318).

If it is not the first time the field has been corrected (step 308), it is determined whether this field is independent or related to other fields (step 310). That is, could the error in the field be due to an error in another field? If yes, it has "related" fields; if no, it is an independent field. For example, if the field is the numerical difference between two numbers (i.e., A−B=C), an error in the difference may be due to an error in the two numbers to be subtracted or in the difference. If the field is related to other fields, the field is displayed along with the related field or fields (step 314). The error location may be displayed on the screen. For example, if the inputs are:

$$\begin{array}{r}151200\\-\phantom{0}0\\\hline 152200\end{array}$$

an error probably occurred in the third column from the left. The error may have occurred in any of these fields. Most likely, either the first number or the difference was improperly entered. The characters in which the error is likely to have occurred is identified by, for example, changing the background color. Using, for example, "carries" and "borrows" in simple decimal system mathematics, if only a single error occurred, it may be easily located. Attached in Appendix A is pseudocode for a preferred embodiment wherein the error location in the equation A−B =C is located and the background is highlighted in red. A person skilled in the art readily recognizes that other types of errors (addition, multiplication, division, etc.) may also be located in a similar manner.

The previous corrections to the related fields may also be indicated. This allows the editor to determine that the incorrect result is due to an improper character string input as a correction, or if the error is due because a field was corrected, which correction causes an error in another field. If the field is independent, it is displayed with the field name highlighted (step 312).

After the field is displayed—either highlighted or with the related fields—corrected character stings are input to correct the field (step 316). The corrected field is again integrity checked (step 318). If it does not pass, the field is again corrected (steps 308–318). If the field passes (step 318), the form is checked to determine if every field has passed post-word processing or field inspection (step 320). If every field has not passed the next field is processed (step 322). If it has, the field editing process is completed for that document. If all documents in the batch have not been field checked (step 324), fields from the next document are checked (step 326). If all documents in the batch have been field checked (Step 324), the field checking process is complete.

Figure 8:
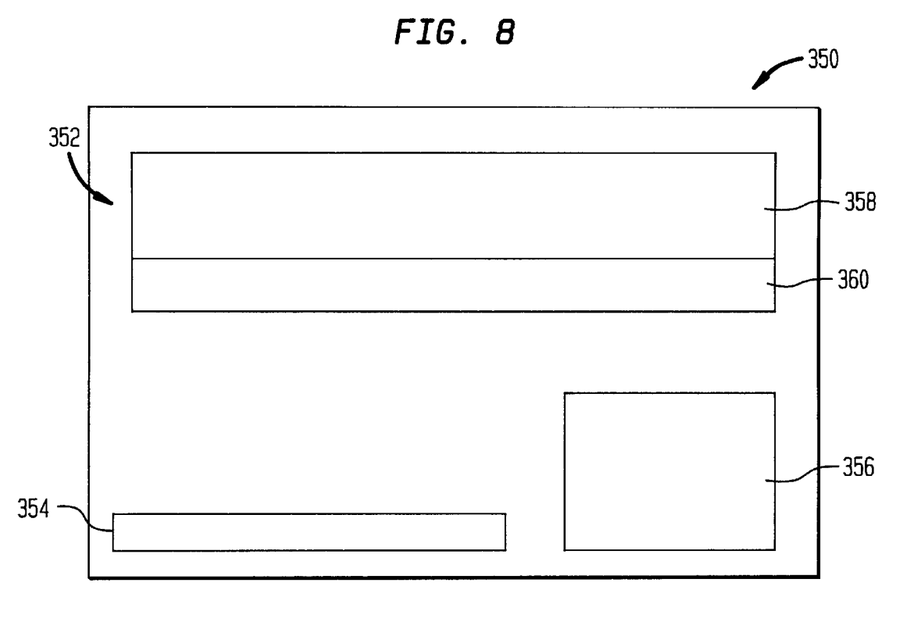
FIG. 8 is an illustrative screen display layout during field editing.

FIG. 8 is an illustrative screen display layout 350 during field editing. In a preferred embodiment of the invention, the monitor 58 may be arranged to have a screen configuration 350 shown in FIG. 8. The screen 350 has a display area 352, a file identification area 354, and a related fields display area 356. The display area 352 is further divided into two sections, an image section 358 and a character section 360. The image section 358 displays the image of the rejected field. The character section 360 includes a space for the corrected characters to be viewed by the editor. The file identification area 354 displays information about the displayed fields. The related fields display area 356 displays related fields that do not pass an integrity check (such as an incorrect mathematical entry, or an incorrect town/zip code). The location of the possible error in the fields may be determined mathematically (see Appendix A) and highlighted or otherwise indicated. In a preferred embodiment, the possible error location may be identified by a different screen background or text color.

Figure 9:
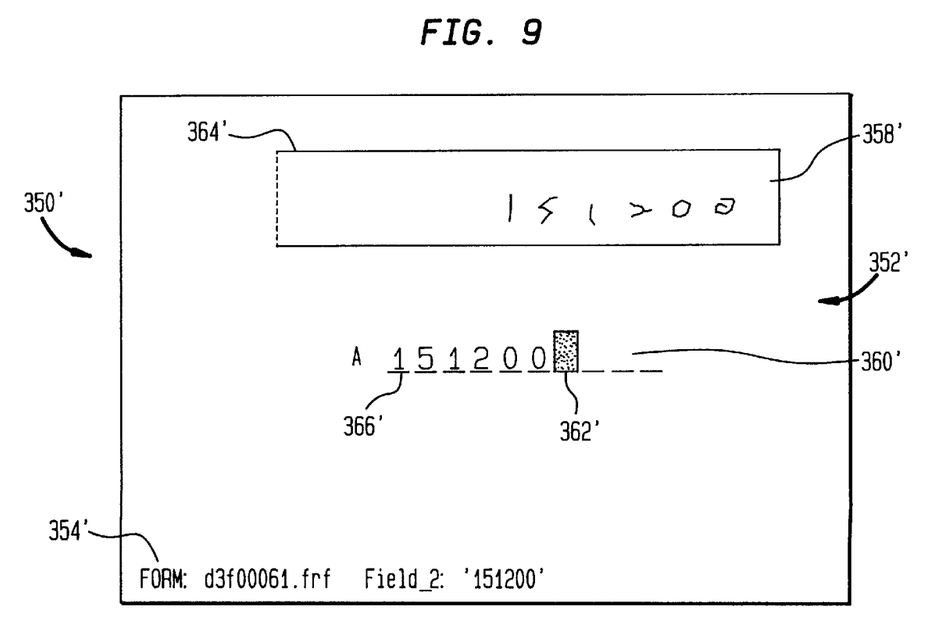
FIG. 9 is an exemplary field editing screen display.

FIG. 9 is an exemplary character editing screen display 350' displaying a rejected independent field (e.g., no other fields are related to the error). The display area 352' has an image display section 358' and a character section 360'. The file identification line 354' identifies the file and field from which the rejected characters are taken. A cursor 362' is shown. The rejected field images are enclosed in a frame 364'. Below the frame is a number of lines 366' to input a corrected character string.

Figure 10:
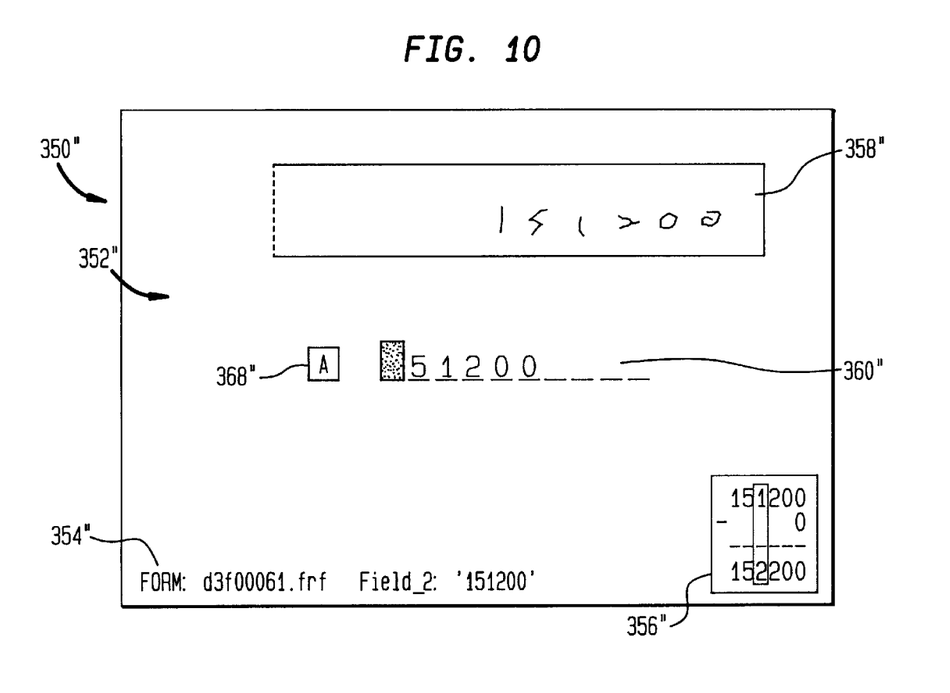
FIG. 10 is an exemplary field editing screen display showing related fields and indicating a possible error location.

FIG. 10 is an exemplary character editing screen display 350" displaying a rejected field having an error related to other fields. The related fields display area 356" displays each related field and may identify characters in which the error is likely to be located. The image display section 358" displays one possibly incorrect field at a time. A field identifier 368' alerts the editor to which of the rejected fields is being displayed (i.e., here it is Field "A").

In a preferred embodiment, the field editing process is performed as follows. A field having an error is displayed on the monitor 58 for an editor. The editor inputs a corrected character string using an input device 60 such as a keyboard or mouse. After the correction is made, the editor may request the next field to be corrected. If the corrected field still does not pass the integrity check, the editor will be informed that the screen will not advance to the next field. This indication maybe a beep, a message on the screen and/or other indication. The cursor will return to the first character of the field. If a number of related fields are rejected, the cursor returns to the first character of the first field.

A preferred embodiment may use the following key definitions:

| Data | Key |
|---|---|
| Unrecognizable Strings | Enter "9" in the entire field (e.g., 99999999 . . .) |
| Illegitimate Strings | Escape Key |
| Extra Character | Delete With Space Bar |

An unrecognizable string is an image that cannot be read clearly and thus cannot be corrected by the editor. These fields are replaced with a string of 9s. An illegitimate string is an image that can be read clearly, but which does not make sense in the context of the field. For example, a number in a field where letters should be found is an illegitimate string.

CONCLUSION

By first correcting the unrecognized characters of one or more documents, the manual editor performs the least work intensive process first. That is, individual characters, not fields or entire forms, are reviewed and corrected. Moreover, performing character correction increases the likelihood that the character edited forms will pass the field and form recognition processes. Thus, the manual editing process is performed efficiently for a number of documents simultaneously.

Arranging rejected characters in size and/or image density order provides the editor with a neater, easier to read screen display. This increases efficiency and accuracy. The field editing determines if a field error may be related to entries in other fields. If so, these fields are displayed.

The inventive method was tested by several data entry operators. Several 500 document batches (each document having approximately 35 characters) were processed by the operators using a prior art method and the inventive method. Using the prior art method, the data entry operators processed each batch in an average time of approximately 65 minutes. Using the inventive method, the data entry operators processed each batch in an average time of approximately 18 minutes. Thus, the inventive method improves efficiency approximately 2.6 times above the prior art method.

The inventors are not aware of any previously known on-screen editing process that makes efficient use of OCR technology, user operations, and human engineering principles to provide a coherent and smooth correction process. No previously known on-screen editing process makes efficient use of electronic computing power to minimize human labor.

The present invention is not limited to the disclosed embodiment, but rather various modifications, substitutions, and structures may be used without departing from the scope of the present invention.

(2) documents not having unrecognized characters;
f. performing a field edit on fields from the documents failing the first integrity check;
g. performing a second integrity check on the field edited fields; and
h. saving the field edited information if it passes the second integrity check.

2. The method of claim 1, wherein the step of determining if characters on the optically scanned document are not recognized further comprises:

---

APPENDIX A

File name: GET_HINT.C

```
sprintf( buffer, "          ");
strcpy( &buffer[ 10-strlen(A_RecogStr) ], A_RecogStr );
strcpy( A_RecogStr, buffer );
sprintf( buffer, "          ");
strcpy( &buffer( 10-strlen(B_Recogstr) ], B_RecogStr );
strcpy( B_RecogStr, buffer );
sprintf( buffer, "          ");
strcpy( &buffer[ 10-strlen(C_Recogstr) ], C_RecogStr );
strcpy( C_RecogStr, buffer );
   color = E_GREEN;
   sprintf( buffer, " A" );
   msc_draw_string( color, Scr_CmdHint.left + text_width, Scr_CmdHint.top + text_height, buffer );
   sprintf( buffer, " B" );
   msc_draw_string( color, Scr_CmdHint.left + text_width, Scr_CmdHint.top + 2*text_height, buffer );
   sprintf( buffer, " C" );
   msc_draw_string( color, Scr_CmdHint.left + text_width, Scr_CmdHint.top + 3*text_height, buffer );
carry = 0;
for( j = 9; j >= 0; j-- ) {
   av = isdigit(A_RecogStr[j]) ? A_RecogStr[j] - '0': 0;
   bv = isdigit(B_RecogStr[j]) ? B_RecogStr[j] - '0': 0;
   cv = isdigit(C_RecogStr[j]) ? C_RecogStr[j] - '0': 0;
   pass = 0;
   if( carry ) {
      if( av == 0 ) {
         av = 9;
         carry = 1;
      }
      else {
         av--;
         carry = 0;
      }
   }
   if( av >= bv ) {
      if( cv == (av-bv) ) pass=1;
   }
   else {
      if( cv == (10+av-bv) ) pass=1;
      carry = 1;
   }
   color = pass ? E_GREEN : E_RED
   sprintf( buffer, "%c", A_RecogStr[j] );
   msc_draw_string( color, Scr_CmdHint.left + (j+3)*text_width, Scr_CmdHint.top + text_height, buffer );
   sprintf( buffer, "%c", B_RecogStr[j] );
   msc_draw_string( color, Scr_CmdRint.left + (j+3)*text_width, Scr_CmdHint.top + 2*text_height, buffer );
   sprintf( buffer, "%c", C_RecogStr[j] );
   msc_draw_string( color, Scr_CmdHint.left + (j+3)*text_width, Scr_CmdHint.top + 3*text_height, buffer );
}
```

---

We claim:

1. A method for manually editing a plurality of optically scanned documents, comprising the steps of:
   a. determining if characters on the optically scanned documents are not recognized;
   b. accumulating a plurality of unrecognized characters from the documents;
   c. displaying together the accumulated unrecognized characters;
   d. manually editing the unrecognized characters;
   e. performing a first integrity check on:
      (1) documents having manually edited characters; and a. classifying an optically scanned document as one of:
      (1) completely recognized;
      (2) manual editing required; and
      (3) rejected;
   b. saving the document if it is classified as completely recognized;
   c. performing an edit on the entire document if it is classified as rejected; and
   d. performing claim 1, steps b–h on the document if it is classified as manual editing required.

3. The method of claim 1, wherein the step of accumulating a plurality of unrecognized characters comprises saving in an intermediate file the unrecognized characters and information identifying the location of the unrecognized character.

4. The method of claim 1, wherein the step of manually editing the unrecognized characters further includes the steps of:

a. displaying on a first portion of a monitor the accumulated unrecognized characters; and b. providing on a second portion of the monitor an area for displaying input corrected characters.

5. The method of claim 4, further comprising displaying on a third portion of the screen information about the displayed characters.

6. The method of claim 4, wherein before the step of displaying, selecting one of either only numerals and only letters for display.

7. The method of claim 4, wherein before the step of displaying, selecting a character editing screen display set up.

8. The method of claim 7, wherein the step of selecting a character editing screen display setup further comprises the steps of:

a. accumulating a number of unrecognized characters;

b. selecting whether the unrecognized characters are to be displayed at a uniform size;

c. if the unrecognized characters are not selected to be displayed at a uniform size, arranging the accumulated characters in size order;

d. if the unrecognized characters are selected to be displayed at a uniform size:
      (1) normalizing the unrecognized character;
      (2) determining an image density of the normalized unrecognized characters; and
      (3) arranging the normalized characters in order of image density;

e. aligning the unrecognized characters.

9. The method of claim 8, wherein the step of aligning further comprises the steps of:

a. calculating a center alignment for each character to be displayed; and b. determining the alignment line for each character to be displayed.

10. The method of claim 1, wherein the step of performing an integrity check further comprises comparing a field entry with predetermined information to cross-check accuracy of the entry.

11. The method of claim 1, wherein the step of performing the integrity check further comprises checking a value range of a field entry to determine if it satisfies a predetermined relationship.

12. The method of claim 1, wherein the step of field editing further comprises the steps of:

a. displaying on a first portion of a monitor a rejected field; and b. providing on a second portion of the monitor an area for displaying an input corrected character string.

13. The method of claim 12, further comprising displaying on a third portion of the screen information about the rejected field.

14. The method of claim 12, further comprising displaying on a fourth portion of a monitor the rejected field and fields elated to the rejected field.

15. The method of claim 14, further comprising indicating characters in the rejected field and related fields that are likely to be erroneous.

16. The method of claim 1, wherein if the field fails the second integrity check, the step of field editing further comprises the steps of:

a. determining if the field is either one of an independent field and a related field;

b. if the field is an independent field, highlighting a name of the rejected field;

c. if the field is related, displaying the rejected field and fields related to it.

17. A method for displaying a number of unrecognized optically scanned images, comprising the steps of:

a. accumulating a number of unrecognized characters from a plurality of documents;

b. selecting if the accumulated unrecognized characters are to be displayed at a uniform size;

c. if the accumulated unrecognized characters are not selected to be displayed at a uniform size, arranging the accumulated characters in size order;

d. if the accumulated unrecognized characters are selected to be displayed at a uniform size:
      (1) normalizing the unrecognized characters;
      (2) determining an image density of the accumulated unrecognized characters;
      (3) arranging the characters in order of image density;

e. aligning the accumulated unrecognized characters; and f. displaying the aligned accumulated unrecognized characters.

18. The method of claim 17, wherein the step of aligning further comprises the steps of:

a. calculating a center alignment for each character to be displayed; and b. determining the alignment line for each character to be displayed.

19. The method of claim 17, further comprising the steps of after aligning the unrecognized characters:

a. displaying on a first portion of a monitor the accumulated unrecognized characters; and b. providing on a second portion of the monitor an area for displaying input corrected characters.

20. The method of claim 19, further comprising displaying on a third portion of the screen information about the displayed characters.

21. The method of claim 17, wherein before the step of accumulating, selecting one of only numerals and only letters for display.

* * * * *